Figure 1:
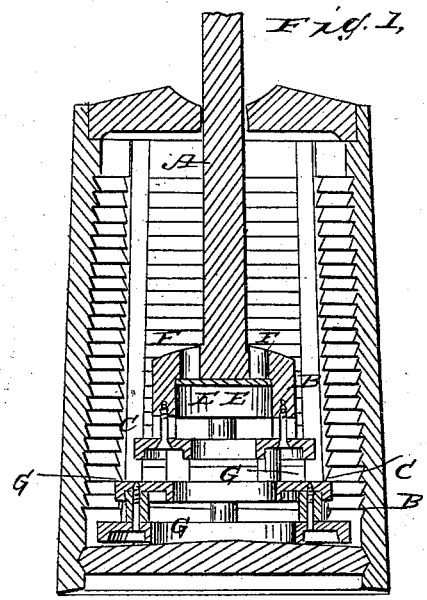
Figure 2:
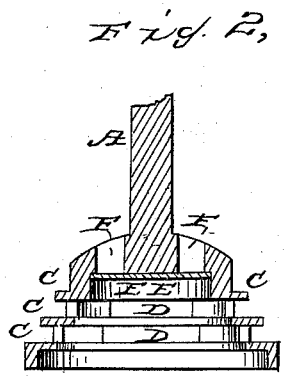
Figure 3:
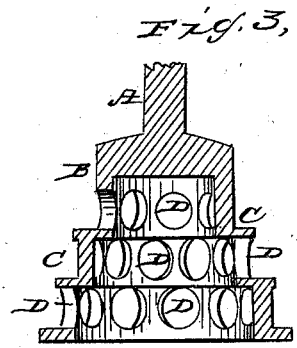
Figure 4:
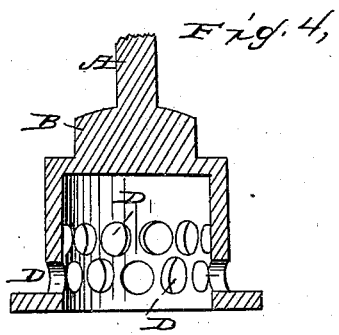

H. W. WHITE.
Churn.

No. 54,632.

Patented May 8, 1866.

Witnesses:
W F Hall
James L Crum

Inventor:
Hiram W White
By Munn & Co
Attorneys

UNITED STATES PATENT OFFICE.

HIRAM W. WHITE, OF OLNEY, ILLINOIS.

IMPROVEMENT IN CHURNS.

Specification forming part of Letters Patent No. 54,632, dated May 8, 1866.

*To all whom it may concern:*

Be it known that I, HIRAM W. WHITE, of Olney, in the county of Richland and State of Illinois, have made a new and useful Improvement in Churns; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Number 1 is a vertical section through the churn and dasher. Nos. 2, 3, and 4 show modified forms of dasher of the same general construction and involving the same principle of operation.

The improvement consists of a hollow plunger-dasher adapted for use in any of the ordinary forms of plunger-churns. The dasher B consists of an inverted hollow chamber inwardly and outwardly of a pyramidical, conical, or dome shape, and having upon its exterior a series of steps or successive elevations of diminishing area, the walls of the said chamber being either open or pierced with holes for the passage of air and cream to and fro as the plunger is dashed up and down in the cream, carrying a portion of air down with it at each stroke and forcibly ejecting the cream or milk through the holes or openings in the dasher against the corrugated interior of the churn.

In the drawings, A is the handle, and B the dasher, of the churn. The said dasher is shown in several different forms, all of them agreeing in the special characteristics—namely, the inverted-cup shape, the exterior step-like shape, and the provision of holes or openings in the sides of the hollow dasher.

C represents the steps, and D the holes, which are round or elongated, in the different figures.

E are valves, of elastic material, guarding the orifices F, through which air passes during the upward suction of the dasher, the valve closing when the dasher is making its downward stroke.

In the form shown in Fig. 1 the successive series of flanged annular plates G G G have a capacity on the lower sides for carrying down air into the cream, while the general form of the dasher agrees with the other figures in the general cup form, with openings for the passage of the air and the milk or cream.

The valve is an incident, an auxiliary, not a necessary feature of the invention.

The interior of the churn is grooved or corrugated to increase the friction of the fluid which is thrown against it, and so aids in breaking the butyraceous vesicles. As the dasher descends, the cream passing up through the central opening of each annulus is forced against the under surface of the annulus next above and forcibly projected against the walls of the churn. The concussion thus produced quickly breaks the globules and releases the butter. A like effect is produced by the cream passing from one elevation to another during the ascent of the butter.

By this apparatus, under favorable circumstances as regards temperature, &c., the butter may be produced and gathered in from two to five minutes.

Having described my invention, what I claim therein as new, and desire to secure by Letters Patent, is—

1. The dasher with pyramidical or conical gradatory exterior and interior chamber, substantially as described and represented.

2. The churn with its interior surface corrugated or grooved, substantially as and for the purpose described.

HIRAM W. WHITE.

Witnesses:
ALEXR. A. C. KLAUCKE,
EDWARD H. KNIGHT.